United States Patent [19]

Konno et al.

[11] Patent Number: 4,511,629

[45] Date of Patent: Apr. 16, 1985

[54] MAGNETIC RECORDING MEDIUM

[75] Inventors: Ryozo Konno, Omiya; Makio Sugai, Fujimi; Yuichi Kubota; Masaharu Nishimatsu, both of Komoro; Yukihiro Isobe, Usudamachi; Kazushi Tanaka, Komoro; Osamu Shinoura, Saku, all of Japan

[73] Assignees: TDK Electronics Co., Ltd.; Toyo Ink Mfg. Co., Ltd., both of Tokyo, Japan

[21] Appl. No.: 463,419

[22] Filed: Feb. 3, 1983

[30] Foreign Application Priority Data

Feb. 5, 1982 [JP] Japan .................................. 57-16301
Feb. 5, 1982 [JP] Japan .................................. 57-16302

[51] Int. Cl.$^3$ .......................... H01F 10/00; B05D 5/12
[52] U.S. Cl. ..................................... 428/522; 428/694; 428/900
[58] Field of Search ................. 427/54.1, 44, 127–132, 427/48; 428/900, 694, 695

[56] References Cited

U.S. PATENT DOCUMENTS 4,210,703  7/1980  Scantlin et al. ...................... 428/413
4,343,831  8/1982  Tsuji et al. ............................ 427/44

OTHER PUBLICATIONS

PCT Gazette Sect. I, p. 2077, No. 22/1981, *Magnetic Recording Medium*, WO81/02646.

*Primary Examiner*—Bernard D. Pianalto
*Attorney, Agent, or Firm*—Seidel, Gonda & Goldhammer

[57] ABSTRACT

In a magnetic recording medium made by applying a non-magnetic undercoat and a magnetic top coat on a base, the undercoat comprises a radiation-curable coating material which contains a compound with a molecular weight of not less than 400, having one type of double bond selected from among acrylic, allylic, and maleic double bonds, the undercoat being formed by exposure to radiation. Specifically, the undercoating material contains at least two types of compounds selected from (A) those having a molecular weight of over 5000, preferably over 8000 and having two or more double bonds selected as above, (B) those having a molecular weight of 400 or more but less than 500, preferably in the range of 600 to 3000, and two or more double bonds selected as above, and (C) those having a molecular weight of less than 400 and one or more double bonds selected from among acrylic, allylic, maleic, and styrenic double bonds. At least two types of the compounds are used in a mixing ratio of 0–90 wt % (A), 0–80 wt % (B), and 0–50 wt % wt % (C).

14 Claims, No Drawings

MAGNETIC RECORDING MEDIUM

BACKGROUND OF THE INVENTION

This invention relates to a magnetic recording medium excellent in wear resistance and surface smoothness and, moreover, having good electrical properties.

Varied forms of magnetic recording media, such as cassette tapes, open reel tapes, video tapes, magnetic cards, and magnetic discs, are made by coating a base film of polyester, polyvinyl chloride, polyacetate, paper or the like with a coating material, printing ink or the like (hereinafter referred to as the "coating material") containing a magnetizable metal oxide or other metallic material, such as iron oxide, and then magnetically orienting, drying, and if necessary curing the coating film. Usually, the coating material also contains as a resin binder a vinyl chloride-vinyl acetate copolymer, polyurethane, polyacrylic ester, or sometimes epoxy resin. According to the intended use, the composition may further contain a plasticizer, rubber, dispersant, antistatic agent, pigment, and/or other additives.

While various thermoplastic and thermosetting resins are in use as binders, curable binders such as the thermosetting resins are generally preferred because of their more desirable physical properties, including greater resistance to wear, heat, and solvents.

For a magnetic recording tape or other recording medium the bond between the base film of polyester and the magnetic coating film formed thereon is one of very important properties of the product. If the adherence is insufficient, the coating film can be partly stripped off the base as the tape is subjected to some external forces, e.g., momentary strong stresses. When this occurs, the stripped tape portions will no longer be capable of recording or will be devoid of recorded information. In order to strengthen the bond, various treatments have hitherto been proposed, including chemical processing and surface roughening of the polyester or other base film, and more commonly the subjection of the base to corona discharge or other treatments. However, the polyester film and the like in use for magnetic recording tapes are crystalline polymers with low polarities, and they do not allow the coating material to attach itself readily to the base. Furthermore, the high pigment concentration keeps the coating material from thoroughly wetting the polyester base surface, thus leading to deficient adherence.

In producing an increased adherence, it has recently been considered effective to adopt a so-called undercoating technique whereby a resin solution is applied on a polyester film and then a final coat of magnetic coating material is formed. A drawback of the technique is that the undercoat is swollen by the organic solvent used in the top coat of magnetic coating material, resulting in unevenness of coating, hence unsmoothness and inferior sensitivity of the magnetic coating layer. Attempts to remove the drawback by the use of some thermosetting resin as the undercoat resin have scarcely proved successful, because the heat treatment for curing softens the unreacted portion of the undercoat resin or the curing agent so that, as the undercoated tape is taken up on a reel, the coat sticks to the back of the base film in the next layer of the roll. Additional disadvantages of thermal curing are the problem of lacquer pot life and the impossibility of continuously forming a magnetic layer as the top coat due to the time-consuming thermal curing.

SUMMARY OF THE INVENTION

In an effort to eliminate the above-described disadvantages of the prior art, we have developed a method which comprises using a certain radiation-curable compound as the binder for the undercoat composition, applying the composition on a base, drying the coat when desired, exposing it to radiation so as to effect radiation-initiated three-dimensional crosslinking or curing, and then applying a top coat of magnetic coating material. The method has given very satisfactory results. According to the method, the undercoat is crosslinked or cured before the application of the magnetic top coat and therefore is not swollen by the organic solvent. This permits direct application of the magnetic coating material on the undercoat and hence uninterrupted, simplified process operation. As the coated tape is wound on a reel after irradiation, the undercoat in a relatively advanced stage of curing has no possibility of sticking to the back of the next layer of the base film, and the reeled tape can be stably stored. Thus, the certain radiation-curable compound used as a binder for the undercoat will overcome all the difficulties with the ordinary undercoating.

The term "radiation-curable compound" as used herein means any of the compounds containing at least one unsaturated double bond in the molecule which generates radicals upon irradiation and is cured by crosslinking or polymerization.

Our intensive investigations for the solution of the problems associated with the primer coating of magnetic recording medium have now revealed that undercoating with a composition containing a radiation-curable compound will produce within a short time an undercoat having good solvent resistance and adhesiveness, which in turn will give a magnetic recording medium excellent in surface smoothness and electrical properties. The discovery has led to the perfection of the present invention.

The present invention provides a magnetic recording medium comprising a base, a nonmagnetic undercoat applied thereon, and a magnetic coating layer further formed thereon, said undercoat comprising a radiation-curable coating material which contains a compound with a molecular weight of not less than 400 having one type of double bond selected from among acrylic, allylic, and maleic double bonds, said undercoat being finished by exposure to radiation.

The invention also provides a magnetic recording medium as defined above but in which the radiation-curable coating material contains at least two types of compounds selected from among:

(A) Compounds with a molecular weight of not less than 5000, preferably not less than 8000, having two or more double bonds of a type selected from among acrylic, allylic, and maleic double bonds;

(B) Compounds with a molecular weight of 400 or more but less than 5000, preferably in the range of 600 to 3000, having one or more double bonds of a type selected from among acrylic, allylic, and maleic double bonds; and (C) Compounds with a molecular weight of less than 400, having one or more double bonds of a type selected from among acrylic, allylic, maleic, and styrenic double bonds.

Further, according to the invention, the radiation-curable coating material of the magnetic recording medium contains at least two types of the compounds (A), (B), and (C) in a mixing ratio of 0–95 wt. % (A), 0–80 wt. % (B), and 0–50 wt. % (C), in complementary amounts to make up a total of 100 wt. %. Preferably, the radiation-curable coating material contains (A) and (B) in a mixing ratio of 20–95 and 5–80 wt. %, respectively. When the radiation-curable coating material does not contain (A) the compounds (B) and (C) are preferably in a ratio of 50–95 wt. % and 5–50 wt. %. When it does not contain (B) the compounds (A) and (C) are preferably in a ratio of 50–95 wt. % and 5–50 wt. %. When it contains (A), (B) and (C) a mixing ratio of 10–90 wt. %, 5–90 wt. % and 5–50 wt. % is preferred. Preferably, electron beams may be used for the exposure of the undercoat to radiation, and the radiation-curable coating material may additionally contain 1–10 wt. % photopolymerizable sensitizer which produces the undercoat upon ultraviolet irradiation.

The undercoating material according to the invention, when applied on a base and subjected to irradiation, will instantaneously undergo radical polymerization to form an undercoat having a three-dimensional network structure. The undercoat is not swollen by the solvent in the topcoat when the latter in applied thereon but can maintain the surface smoothness. If the radiation-curable coating material comprises essentially a single reactive monomer with a molecular weight of less than 400, the curing reaction by cross-linking will cause a serious shrinkage of the resulting coat, with consequent curling of the base, low dimensional stability, and poor adhesiveness of the coating layers as are known in the art. Low-molecular-weight monomers are often compounds of such low boiling points that they can evaporate during the course of drying and curing, causing a trouble in commercial production.

DETAILED DESCRIPTION

The method of the invention will now be more fully described. The radiation-curable coating material to be used in practicing the invention comprises compounds, preferably two or more compounds usually dissimilar in molecular weight and in the number of functional groups contained, each compound having at least one radiation-curable, unsaturated double bond, such as acrylic, allylic, or maleic double bond, at the end of the chain, in the principal chain or in a side chain of the molecule. Proper examples of the compounds are as follows:

I. Reaction products obtained by reacting a compound having one or more hydroxyl groups in the molecule with a polyisocyanate compound in a molar ratio of one to one or more, and then reacting the resultant with at least one mole of a monomer having a group reactive with the isocyanate group and at least one radiation-curable, unsaturated double bond. An example is a resin, prepolymer, oligomer, or telomer having two acrylic double bonds at the molecular ends, prepared by reacting two moles of toluene diisocyanate with one mole of a bifunctional polyether (marketed by Asahi Denka Kogyo K.K. under the trade designation "Adeka Polyether P-1000"), which is made by adding propylene oxide to propylene glycol, and further reacting the resultant with two moles of 2-hydroxyethyl methacrylate.

The compounds having one or more hydroxyl groups which may be employed include polyfunctional polyethers, such as "Adeka Polyether P-700", "—P-1000", and "—G-1500" (All made by Asahi Denka Kogyo), and "Polymeg 1000" and "—650" (both made by the Quaker Oats Co.); cellulose derivatives, such as nitrocellulose, acetylcellulose, and ethyl cellulose; hydroxyl-containing, partly saponified vinyl chloride-vinyl acetate copolymers, such as "Vinylite VAGH" (marketed by Union Carbide Corp. of the U.S.); polyvinyl alcohol, polyvinyl formal; polyvinyl butyral; polyfunctional polyesters, such as "Polycaprolactone PCP-0200", "—PCP-0240", and "—PCP-0300" (all made by Chisso Corp.); saturated polyester resins prepared by the ester linkage of a saturated polybasic acid, such as phthalic, isophthalic, terephthalic, adipic, succinic, or sebacic acid, with a polyhydric alcohol, such as ethylene glycol, diethylene glycol, 1,4-butanediol, 1,3-butanediol, 1,2-propylene glycol, dipropylene glycol, 1,6-hexane glycol, neopentyl glycol, glycerin, trimethylolpropane, or pentaerythritol; and acrylic polymers containing at least one type of hydroxyl-containing acrylic or methacrylic esters as the polymer component.

Examples of the polyisocyanate compounds useful for the invention are toluene 2,4-diisocyanate, toluene 2,6-diisocyanate, xylene 1,4-diisocyanate, m-phenylene diisocyanate, p-phenylene diisocyanate, hexamethylene diisocyanate, isophorone diisocyanate, and "Desmodur L" and "—IL" (both made by Bayer AG of West Germany).

The monomers having a group reactive with the isocyanate group and also having at least one radiation-curable, unsaturated double bond include: hydroxyl-containing esters, such as 2-hydroxyethyl ester, 2-hydroxypropyl ester, and 2-hydroxyoctyl ester, of acrylic and methacrylic acids; monomers having active hydrogen reactive with the isocyanate group and also having acrylic double bonds, such as acrylamide, methacrylamide, and n-methylolacrylamide; and monomers having active hydrogen reactive with the isocyanate group and also containing at least one radiation-curable, unsaturated double bond, such as allyl alcohols, maleic acid esters of polyhydric alcohols, and mono- and diglycerides of long-chain fatty acids having unsaturated double bonds.

II. Reaction products of a compound having one or more epoxy groups in the molecule and a monomer having a group reactive with the epoxy group and at least one radiation-curable, unsaturated double bond, in a molar ratio of one to one or more. An example is a resin, prepolymer, or oligomer in which acrylic double bonds are held in pendant fashion in the molecule, prepared by reacting acrylic acid with an epoxy-containing thermoplastic resin obtained by radical polymerization of glycidyl methacrylate, and thereby effecting a ring-opening reaction of the carboxyl and epoxy groups. Another example is a resin, prepolymer, or oligomer prepared by reacting maleic acid and effecting a ring-opening reaction of the carboxyl and epoxy groups so that the product has at least one radiation-curable, unsaturated double bond in the molecular structure.

Examples of the compounds having one or more epoxy groups in the molecule are homopolymers, or copolymers with other polymerizable monomers, of an epoxy-containing acrylic or methacrylic ester, such as glycidyl acrylate or glycidyl methacrylate; "Epikote 828", "—1001", "—1007", and "—1009" (all made by Shell Chemical Co.); and various other types of epoxy resins.

Among the monomers having a group reactive with the epoxy group and at least one radiation-curable, unsaturated double bond are: carboxyl-containing acrylic monomers, such as acrylic and methacrylic acids; primary- and secondary-amino-containing acrylic monomers, such as methylaminoethyl acrylate and methylaminoethylmethacrylate; and polybasic acid monomers having at least one radiation-curable, unsaturated double bond, such as maleic, fumaric, crotonic, and undecylenic acids.

III. Reaction products of a compound having one or more carboxyl groups in the molecule and a monomer having a group reactive with the carboxyl group and at least one radiation-curable, unsaturated double bond, in a molar ratio of one to one or more. An example is a resin, prepolymer, or oligomer prepared by reacting glycidyl methacrylate with a carboxyl-containing thermoplastic resin obtained by solution polymerization of methacrylic acid, and effecting a ring-opening reaction of the carboxyl and epoxy groups in the same manner as in II. above, thus introducing at least one acrylic double bond into the molecule of the product.

The compounds containing one or more carboxyl groups in the molecule are, e.g.: polyesters having a carboxyl group or groups in the molecular chain or at the molecule ends; and homopolymers of radically polymerizable, carboxyl-containing monomers, such as acrylic acid, methacrylic acid, maleic anhydride, and fumaric acid, and copolymers of such monomers with other polymerizable monomers.

Examples of the monomers having a group reactive with the carboxyl group and at least one radiation-curable, unsaturated double bond are glycidyl acrylate and glycidyl methacrylate.

IV. Polyester compounds containing at least one radiation-curable, unsaturated double bond in the molecular chain. An example is an unsaturated polyester resin, prepolymer, or oligomer having at least one radiation-curable, unsaturated double bond, which consists of a saturated polyester resin formed by ester linkage of a polybasic acid and a polyhydric alcohol as classified in I. above, with part of the polybasic acid being replaced by maleic acid.

The polybasic acid and polyhydric alcohol ingredients of the saturated polyester resin may be any of the compounds mentioned in I. above, and the radiation-curable, unsaturated double bonds may be those of maleic acid, fumaric acid, or the like.

The radiation-curable, unsaturated polyester resin is made in the usual manner from at least one type each of polybasic acid and polyhydric alcohol ingredients with the addition of maleic acid, fumaric acid, or the like. In the presence of a catalyst the starting material mixture is allowed to react for dehydration or dealcoholation in a nitrogen atmosphere at a temperature in the range of 180°–200° C., and, following the conclusion of the reaction, the temperature is raised to 240°–280° C., and then condensation is effected under reduced pressure of 0.5–1.0 mmHg to obtain the objective polyester resin. The content of maleic, fumaric, or other acid in the starting mixture is in the range of 1–40 mol %, preferably in the range of 10–30 mol %, in the total acid amount for the facility of crosslinking and for desirable radiation curability during the course of manufacture of the magnetic recording medium.

V. Reaction products of a compound having one or more hydroxyl groups, a polyisocyanate compound, and a compound having an allyl group and a group reactive with the isocyanate group, like those in I. above, can be mentioned as allyl-containing prepolymers.

VI. Depending on the intended use of the products, low-molecular-weight compounds having at least one radiation-curable, unsaturated double bond may also be employed. Examples of those low-molecular-weight compounds are styrene, methylstyrene, ethylacrylate, ethylene glycol diacrylate, ethylene glycol dimethacrylate, diethylene glycol diacrylate, diethylene glycol dimethacrylate, 1,6-hexane glycol diacrylate, 1,6-hexane glycol dimethacrylate, trimethylolpropane triacrylate, trimethylolpropane trimethacrylate, acrylic acid, maleic anhydride, fumaric acid, diallyl maleate, diallyl sebacate, diallyl adipate, allyl acrylate, diallyl phthalate, and allyl alcohol. [The compounds in this class VI. mostly correspond to the compounds (C).]

The radiation-curable coating material according to the invention is obtained by employing suitable ones of the compounds mentioned in I. to VI. above. Singular use of a compound having a molecular weight of more than 400 would require an increased radiation dose because the larger the molecular weight the closer the functional group density and the lower the electron-beam curability. This would result in less curability and inferior thermal resistance of the coating. On the other hand, adherence sometimes decreases as the curability increases.

Radiation beam-curable resins with molecular weights of less than 400, by contrast, exhibit good curability and resistance to solvents and heat but their adhesiveness is not always satisfactory.

Thus, while a single compound having a molecular weight of over 400 may be employed, a combination of a compound in the class (A) having a molecular weight of not less than 5000, preferably not less than 8000, and a compound in class (B) having a molecular weight of not less than 400 but less than 5000, preferably in the range of 600–3000; a compound (A) and a compound (C) with a molecular weight of less than 400; compounds (B) and (C); or compounds (A), (B), and (C) is preferred. Such a combination provides an undercoating material which possesses in a balanced way the diversified properties required of a magnetic recording medium. In brief, a combination of two or more compounds differing in molecular weight gives a magnetic recording medium with a coating having desirable adhesion and curability.

The radiation-curable coating material of the invention may contain various additives according to the necessity.

In the practice of the invention a non-reactive solvent is used when desired. While there is no special limitation, the solvent is chosen in consideration of its compatibility with the binder, solubility of the binder itself, etc. Examples are ketones, such as acetone, methyl ethyl ketone, methyl isobutyl ketone, and cyclohexane; esters, such as ethyl formate, ethyl acetate, and butyl acetate; alcohols, such as methanol, ethanol, isopropanol, and butanol; aromatic hydrocarbons, such as toluene, xylene, and ethyl benzene; ethers, such as isopropyl ether, ethyl ether, and dioxane; and furans, such as tetrahydrofuran and furfural. These solvents are used singly or as a mixture.

The magnetic coating layer according to the invention is not limited to those using a thermoplastic or thermosetting resin as the vehicle but may employ a radiation-curable resin as used in the undercoat and which forms the top coat upon irradiation, so that the undercoat and magnetic coats can be simultaneously exposed to radiation.

The substrate to be coated with the undercoat and magnetic coating material in accordance with the present invention may be the polyethylene terephthalate film that is in wide use as a base material for magnetic recording media. For applications where heat resistance is a necessity, a film of polyimide, polyamide or the like may be utilized. In the case of a polyester film as a thin base, it is often used after mono- or biaxial stretching. Other applications include coating of paper.

As regards the radioactive rays for use in crosslinking or curing the radiation-curable coating material in accordance with the invention, the electron beams from an electron-beam accelerator as the source, $\gamma$-rays from $Co^{60}$, $\beta$-rays from $Sr^{90}$, X-rays from an X-ray generator, and ultraviolet rays are employed. As the radiation source, an electron-beam accelerator or ultraviolet-ray generator is most advantagenously used because of the ease of controlling the absorbed dose, incorporating the source into the process line, and shielding the ionizing radiation.

As for the characteristics of the electron beams to be used in curing the coating film, it is desirable from the viewpoint of transmissivity to choose an electron-beam accelerator which operates with an acceleration voltage of 100–750 kV, preferably 150–300 kV, and effect the irradiation so that the absorbed dose may range from 0.5 to 20 megarads.

The radiation-curable coating material of the invention may contain a photopolymerizable sensitizer to effect ultraviolet curing. The photopolymerizable sensitizer may be any of those known in the art. Examples are benzoins, such as benzoin methyl ether, benzoin ethyl ether, $\alpha$-methyl benzoin, and $\alpha$-chlorodeoxybenzoin; ketones, such as benzophenone, acetophenone, and bis(dialkyl)aminobenzophenone; quinones, such as anthraquinone and phenanethraquinone; sulfides, such as benzyl disulfide and tetramethylthiuram monosulfide. The photopolymerizable sensitizer may be added in an amount of 0.1–10% on the basis of the total weight of the solid resin contents. If necessary, a filler and/or other additive may also be added in amounts not detrimental to the effects of the invention.

The invention is illustrated by examples and comparative examples below, in which all parts and percentages are by weight.

Before proceeding to the examples, typical examples of synthesis will be explained.

EXAMPLE of SYNTHESIS (a)

One hundred parts of a copolymer of vinyl chloride, vinyl acetate, and vinyl alcohol at a ratio of 93:2:5 wt. %, having a molecular weight of 18000, is dissolved with heat in a mixed solvent consisting of 238 parts toluene and 95 parts cyclohexanone. The resulting solution is heated to 80° C., 7.5 parts toluene diisocyanate (TDI) adduct to be described later is added, and after the further addition of 0.002 part each tin octylate and hydroquinone the mixture is allowed to react in an $N_2$ stream at 82° C. until an isocyanate (NCO) reaction rate of 90% or over is reached. Following the conclusion of the reaction, the resultant is cooled and diluted with 38 parts methyl ethyl ketone. The composition thus obtained is referred to herein as Resin (a). The molecular weight of this resin is 19,200.

Synthesis of TDI adduct

In a four-necked flask having a capacity of one liter 348 parts tolylene diisocyanate is heated to 80° C. in an $N_2$ stream. To this isocyanate are added 260 parts 2-hydrooxyethyl methacrylate (2HEMA), 0.07 part tin octylate, and 0.05 part hydroquinone dropwise while controlling the reactor temperature within the range of 80°–85° C. After the addition the mixture is stirred at 80° C. for 3 hours to conclude the reaction. Following the conclusion of the reaction, the product is taken out and cooled to obtain a 2HEMA adduct of TDI as a white paste.

EXAMPLE of SYNTHESIS (b)

One hundred parts saturated polyester resin (a product of Dynamit Nobel AG marketed under the trade designation "L-411") is dissolved with heat in 116 parts each toluene and methyl ethyl ketone. The temperature of the solution is raised to 80° C. Next, 2.84 parts isophorone diisocyanate adduct synthesized generally in conformity with the synthesis example (a) and then 0.006 part each tin octylate and hydroquinone are added. The mixture is allowed to react at 80° C. in an $N_2$ stream to an NCO reaction rate of at least 90%.

The resin composition is labeled Resin (b). The molecular weight of this resin is 20600.

EXAMPLE of SYNTHESIS (c)

A reactor is charged with 291.2 parts each dimethyl terephthalate and dimethyl isophthalate, 64.8 parts dimethyl maleate, 251.2 parts ethylene glycol, 364.8 parts 1,4-butanediol, 81.2 parts 1,3-butanediol, and 4.0 parts tetra-n-butyl titanate. In an $N_2$ stream the charge is allowed to react at 180° C. for removal of methanol. Next, the temperature is increased to 240° C.–260° C., and a condensation reaction is effected under a reduced pressure of 0.5–1 mmHg to yield a linear unsaturated polyester resin with a molecular weight of 8000.

EXAMPLE of SYNTHESIS (d)

A reactor is charged with 250 parts "NIAX Polyol PCP-0200" (a polycaprolactone marketed by Chisso Corp.), 122.2 parts 2-hydroxyethyl methacrylate, 0.024 part hydroquinone, and 0.033 part tin octylate. The charge is dissolved by heating to 80° C., and 163.6 parts TDI is added dropwise while cooling the reactor so that the temperature inside is within the range of 80°–90° C. After the dropping, the charge is allowed to react at 80° C. until an NCO reaction rate of over 95% is attained. The resin composition so obtained is herein called Resin (d). This resin has a molecular weight of 1140.

EXAMPLE of SYNTHESIS (e)

Into a reactor are placed 148 parts phthalic anhydride, 65 parts 1,3-butanediol, 30 parts ethylene glycol, and 2.5 parts p-toluenesulfonic acid. In a stream of $N_2$, an esterifying reaction of the charge is carried out at 150° C. for one hour and then at 180° C. for 5 hours. The product is cooled to 100° C. and, after the addition of 0.3 part hydroquinone and 28 parts acrylic acid, further esterification of the mixture is effected for 15 hours. An oligoester acrylate (e) having a molecular weight of 2000 is obtained.

EXAMPLE of SYNTHESIS (f)

A reactor is charged with 250 parts "Adeka Polyether P-1000" (a polyether made by Asahi Denka Kogyo), 65 parts 2-hydroxyethyl methacrylate, 0.013 part hydroquinone, and 0.017 part tin octylate. The mixture is dissolved by heating to 80° C., and 87.0 parts TDI is added dropwise while the reactor is being cooled to the range of 80°–90° C. After the addition, the mixture is allowed to react until an NCO reaction rate of 95% or more is achieved. The resin composition is herein referred to as Resin (f). The molecular weight of the resin is 1610.

EXAMPLE of SYNTHESIS (g)

One hundred parts butyral resin (a copolymer composed of butyral/acetal/vinyl alcohol groups at a rate of 42/20/35 wt. % and having a molecular weight of 33800) is dissolved with heat in 200 parts each toluene and methyl isobutyl ketone. The temperature is raised to 80° C., and the same TDI adduct as used in the synthesis example (a) (12.8 parts) is added, followed by the further addition of 0.026 part tin octylate and 0.002 part hydroquinone. The whole mixture is caused to react at 80° C. in an $N_2$ gas stream to an NCO reaction rate of 90% or over.

Following the conclusion of the reaction, the product is cooled and diluted with 238 parts methyl ethyl ketone. The final product, herein called Resin (g), has a molecular weight of 37600.

EXAMPLE of SYNTHESIS (h)

Twenty parts glycidyl methacrylate, 30 parts butyl acrylate, and 37.5 parts each toluene and methyl isobutyl ketone are placed in a reactor and heated to 80° C. Next, 60 parts glycidyl methacrylate, 90 parts butyl acrylate, 6 parts benzoyl peroxide, and 112.5 parts each toluene and methyl isobutyl ketone are added dropwise. The whole mixture is allowed to react at 80°–90° C. for 4 hours. After the addition of 1.25 parts triethanolamine and 0.5 part hydroquinone for dissolution, 40 parts acrylic acid is dropped. The mixture is reacted at the same temperature until an acid value of 5 or less is reached. The resin composition thus obtained is herein called Resin (h). Its molecular weight is 30000.

EXAMPLE of SYNTHESIS (i)

Ten parts 2-hydroxyethyl methacrylate, 40 parts butyl acrylate, and 37.5 parts each toluene and methyl isobutyl ketone are charged into a reactor and heated to 80° C. Then 30 parts 2-hydroxyethyl methacrylate, 120 parts butyl acrylate, and 8 parts benzoyl peroxide as a polymerization initiator are dissolved in 112.5 parts each toluene and methyl isobutyl ketone, and the resultant solution is added dropwise to the above mixture. The whole mixture is allowed to react at 80°–90° C. for 4 hours. To 330 parts of the reaction product is added 57 parts TDI adduct of the synthesis example (a). The mixture is further reacted at 80° C. in the presence of 0.012 part each tin octylate and hydroquinone until an NCO reaction rate of at least 90% is reached. The resin composition is designated (i). The molecular weight of this resin is 20,000.

EXAMPLE of SYNTHESIS (j)

Two hundred parts "Epikote 828" (an epoxy resin marketed by Shell Chemical) is dissolved with heat in 25 parts each toluene and methyl ethyl ketone. After the addition of 2.7 parts N,N-dimethylbenzylamine and 1.4 parts hydroquinone, the mixture is heated to 80° C., 69 parts acrylic acid is added dropwise, and the whole mixture is caused to react at 80° C. to an acid value of not more than 5. The resin composition thus obtained is designated (j). It has a molecular weight of 560.

In the following Examples and Comparative examples the term "parts" indicates parts by weight in terms of solids.

EXAMPLE 1

A composition consisting of
Resin (a)—40 parts
Resin (d)—4 parts
Solvent (toluene/methyl ethyl ketone=1/1)—56 parts was thoroughly mixed and dissolved to prepare a radiation-curable undercoating material. This coating material was applied on a polyester base film to form a coat 0.3 μm in thickness when dry. Following the drying, the coating was hardened by irradiation with electron beams in an $N_2$ atmosphere by an "Electro-curtain" type electron-beam accelerator of ESI Co. at an acceleration voltage of 160 kV with an electrode current of 10 mA to a total absorbed dosage of 3 Mrads. An undercoat was thus obtained.

Next, a magnetic coating material of the composition given below was applied on the undercoat. After the magnetic field orientation of the particles, drying, and surface smoothening, the coated film was slitted into a ½-in.-wide ribbon as a video tape (Specimen #1).

Method of preparing magnetic coating material

A resin solution consisting of
nitrocellulose (Asahi Chemical Industry's "H1/2")—8 parts
"Vinylite VAGH" (Union Carbide's)—10 parts
urethane elastomer (B. F. Goodrich's "Ester 5703")—9 parts
methyl isobutyl ketone—150 parts
cyclohexanone—50 parts
was mixed with
magnetic powder (cobalt-coated iron oxide)—100 parts
α-$Al_2O_3$ (0.5 μm in particle size)—2 parts
lubricant (higher fatty acid-modified silicone oil)—1 part
dispersant (lecithin derived from purified soybean oil)—3 parts and the mixture was dispersed on a ball mill for 24 hours to obtain a magnetic coating material.

EXAMPLE 2

A composition consisting of
Resin (c)—7 parts
"NK Ester A-4G" (acrylic monomer made by Shin-Nakamura Chemical, with molecular weight of 198)—3 parts
solvent (toluene/methyl ethyl ketone=1/1)—90 parts was thoroughly mixed and dissolved, and a radiation-curable undercoating material was prepared. This coating material was applied on a polyester base film to form a coat which would have a dry thickness of 0.2 μm. After drying, the coated film was subjected to electron-beam radiation in an $N_2$ atmosphere with a radiation dosage of 5 Mrads. A crosslinked and cured undercoat resulted. Next, in the same manner as described in Example 1, a magnetic coating layer was formed to obtain a video tape (Specimen #2).

EXAMPLE 3

A composition consisting of
Resin (b)—6 parts
Resin (e)—3 parts
1,6-hexaneglycol diacrylate—1 part
solvent (toluene/methyl ethyl ketone=1/1)—90 parts was mixed well and dissolved to prepare a radiation-curable undercoating material. It was applied on a polyester base film to form a coat 0.1 μm thick when dry. The coated film was dried and exposed to electron-beam radiation in an $N_2$ atmosphere to an absorbed dosage of 2 Mrads. In this way a crosslinked, cured primer coat was formed. Then, in the same manner as in Example 1, a magnetic coating layer was formed thereon to make a video tape (Specimen #3).

EXAMPLE 4

A composition consisting of
Resin (a)—47 parts
Resin (f)—3 parts
benzophenone—0.3 part
triethanolamine—0.1 part
solvent (toluene/methyl ethyl ketone=1/1)—50 parts was mixed and dissolved, and an ultraviolet-curable undercoating material was prepared. It was applied on a polyester base film to form a coat which would be 0.5 μm thick when dry. After drying, the coated film was irradiated with ultraviolet rays at a line speed of 10 m/min under a high pressure mercury lamp (with the output of 80 W per centimeter of effective tube length) to harden the coat.

Next, the magnetic coating material of Example 1 was applied on the undercoat, oriented, dried, and smoothened on the surface. The coated film was slitted to a ½-in.-wide ribbon as a video tape (Specimen #4).

EXAMPLE 5

A composition consisting of
Resin (d)—10 parts
"NK Ester A-4-G"—10 parts
benzoinethyl ether—0.3 part
solvent (toluene/methyl ethyl ketone=1/1)—80 parts was mixed and dissolved to prepare an ultraviolet-curable coating material. It was applied on a polyester base film to form a coat 0.2 μm thick when dry. Excepting this, the procedure of Example 4 was repeated to form a video tape (Specimen #5).

COMPARATIVE EXAMPLE 1

A composition consisting of
vinyl chloride-vinyl acetate copolymer (Union Carbide Corp.'s "Vinylite VAGH")—10 parts
solvent (toluene/methyl ethyl ketone=1/1) 90 parts was mixed and dissolved, and the resultant coating material was applied on a polyester base film to a thickness of 0.5 μm when dry, and dried to form an undercoat. In other respects the procedure of Example 1 was followed to form magnetic coating layer and then a video tape (Specimen A).

COMPARATIVE EXAMPLE 2

The magnetic coating material of Example 1 was applied directly, without any undercoat, on a polyester base film, oriented, dried, and the resulting coat was smoothened on the surface. The coated film was slitted into a ½-in.-wide ribbon as a video tape (Specimen B).

COMPARATIVE EXAMPLE 3

Using a radiation-curable coating material comprising trimethylolpropane trimethacrylate and in the same way as described in Example 1, a video tape (Specimen C) was made.

COMPARATIVE EXAMPLE 4

A composition consisting of
"NK Ester A-4G"—10 parts
solvent (toluene/methyl ethyl ketone=1/1)—89.5 parts
benzoylethyl ether—0.5 part was mixed and dissolved to prepare an ultraviolet-curable coating material, and in the same manner as in Example 4 a video tape (Specimen D) was made.

COMPARATIVE EXAMPLE 5

A composition consisting of
"Vinylite VAGH"—15 parts
urethane elastomer ("Ester 5703")—10 parts
mixed solvent (methyl ethyl ketone/toluene=1/1)—100 parts was mixed and dissolved. After the addition of four parts "Coronate L" (a polyisocyanate compound marketed by Nippon Polyurethane) as a crosslinking agent, the resultant coating material was applied on a base and thermally cured at 60° C. for 48 hours. Then, following the procedure of Example 1, a video tape (Specimen E) was obtained.

EXAMPLES 6-10 AND COMPARATIVE EXAMPLES 6-10

Examples 1-5 and Comparative Examples 1-5 were repeated with the exception that the magnetic coating layer was formed in the following way.

A magnetic coating composition consisting of
cobalt-coated iron oxide—100 parts
"Vinylite VAGH"—15 parts
urethane elastomer ("Ester 5703")—10 parts
methyl ethyl ketone—100 parts
methyl isobutyl ketone—100 parts
toluene—100 parts was mixed up on a ball mill for 48 hours, and 4 parts of Nippon Polyurethane's "Coronate L" was added. This coating material was applied as a top coat or directly on the base. After the magnetic field orientation of the magnetic particles, drying, and surface smoothening, the cost was thermally cured at 60° C. for 48 hours. The video tapes thus obtained are herein referred to Specimens #6-10 and F to J.

EXAMPLE 11

In the same way as in Example 3, a primer coat was formed on a polyester base film. Next, a radiation-curable, magnetic coating material of the composition to be given below was applied thereon, oriented, dried, and smoothened on the surface. The magnetic coat was cured by irradiation with electron beams in an $N_2$ atmosphere by ESI's "Electro-curtain" electron-beam accelerator at an acceleration voltage of 160 kV with an electrode current of 10 mA to a radiation dosage of 5 Mrads. The coated film was slitted into a ½-in.-wide ribbon as a video tape (Specimen #11).

Method of preparing radiation-curable coating material

A mixture composed of
magnetic powder (cobalt-coated iron oxide)—120 parts
Resin (a)—15 parts (in terms of solids)
Resin (d)—15 parts (in terms of solids)
lubricant—0.2 part
$\alpha$-$Al_2O_3$ (0.5 $\mu$m in particle size—2 parts
solvent (methyl ethyl ketone/toluene=1/1)—200 parts was dispersed on a ball mill for 24 hours, and a radiation-curable, magnetic coating material was prepared.

COMPARATIVE EXAMPLE 11

The radiation-curable, magnetic coating material of Example 11 was applied, without an undercoat, on a polyester film, and the magnetic coat was treated and cured in the same manner as in Example 11. The coated tape was slitted into a ½-in.-wide ribbon as a video tape (Specimen K).

The video tapes, Specimens #1 to 11 and A to K, were tested for their peeling strength (adhesiveness) and video sensitivity (RF at 4 MHz) on a VHS type video deck. The results are given in Table 1.

TABLE 1

| Specimen | #1 | #2 | #3 | #4 | #5 | #6 | #7 | #8 | #9 | #10 | #11 |
|---|---|---|---|---|---|---|---|---|---|---|---|
| | | | | | | Example | | | | | |
| Peel str (g/½-in) | 100 | 110 | 160 | 110 | 100 | 100 | 110 | 160 | 110 | 100 | 100 |
| RF sensty* 4 MHz (dB) | +0.1 | 0.0 | +0.1 | +0.2 | 0.0 | +0.1 | 0.0 | +0.1 | +0.2 | 0.0 | 0.0 |

| Specimen | A | B | C | D | E | F | G | H | I | J | K |
|---|---|---|---|---|---|---|---|---|---|---|---|
| | | | | | Comparative Example | | | | | | |
| Peel str (g/½-in.) | 70 | 30 | 10 | 10 | 150 | 70 | 30 | 10 | 10 | 150 | 50 |
| RF sensty* 4 MHz (dB) | −1.5 | 0.0 | −0.2 | +0.1 | +0.1 | −1.8 | 0.0 | −0.1 | 0.0 | +0.2 | 0.0 |

*Based on TDK Electronics' Standard value on a VHS type video deck.

With regard to the adhesivness, all the properly undercoated specimens showed better values than the non-undercoated (B), but those which used compounds of low molecular weights of less than 400 (C and D) gave low values, indicating the desirability of employing high-molecular-weight ingredients. The specimens radiation-cured in accordance with the invention were found satisfactory in respect of adhesion, with higher values than the conventionally treated specimen (A).

As for the video sensitivity at 4 MHz, the specimen (A) the undercoat of which had not been hardened by cross-linking was inferior in the characteristic than the untreated specimen (B). This is presumably ascribable to a swell of the undercoat upon application of the magnetic coat thereon, which in turn impaired the surface smoothness of the magnetic coating layer. On the other hand, the radiation-cured specimens of the invention that facilitated the surface smoothening treatment rather exhibited improvements in properties over the untreated specimen.

The specimens (E and J) that used thermosetting-resin undercoats took so much time for thermal setting that inline operation of the process up to the formation of the magnetic top coat was difficult. In addition, some unfavorable effect apparently due to thermal softening of the unreacted matter was observed.

EXAMPLES 12 AND 13

Resins (a) and (b) were separately dissolved in mixed solvent (toluene/methyl ethyl ketone=1/1), and radiation-curable coating materials each containing 20% solids were prepared.

Each coating material was applied on a polyester film to form a layer which would be 0.3 $\mu$m thick when dry. The resultant coating was dried and irradiated with electron beams in an $N_2$ atmosphere to a radiation dosage of 5 Mrads to obtain a crosslinked, cured undercoat. Next, a magnetic coating layer was formed thereon by the same procedure as described in Example 1. In this way video tapes (Specimens #12 and #13) were made.

EXAMPLES 14–16

Resins (g) to (i) were separately dissolved in mixed solvent (toluene/methyl ethyl ketone=1/1) to prepare radiation-curable coating materials each containing 20% solids.

Each coating material was applied on a polyester film to form a coat 0.1 $\mu$m thick when dry. It was then dried and exposed to electron beams in an $N_2$ atmosphere to a radiation dosage of 5 Mrads to obtain a crosslinked, cured undercoat. Next, a magnetic coating layer was formed thereon in the manner described in Example 6.

Thus, video tapes (Specimens 14 to 16) were made.

| Resin composition used | Specimen No. |
|---|---|
| Resin (g) | #14 |
| Resin (h) | #15 |
| Resin (i) | #16 |

EXAMPLE 17

Resin (j) was dissolved in a solvent mixture (toluene/methyl ethyl ketone=1/1) to prepare a solution containing 20% solids, and then one part of benzoinethyl ether was dissolved in 100 parts of the above solution to give an ultraviolet-curable undercoating material. This coating material was applied on a polyester film to form a coat which would have a dry thickness of 0.3 $\mu$m. The coated film was irradiated with ultraviolet rays at a line speed of 10 m/min under a high pressure mercury lamp (having an output of 80 W per cm of effective tube length) to cure the primer coat.

Next, the magnetic coating material of Example 6 was applied thereon and, after drying, the magnetic coat was smoothened on the surface and slitted into a ½-in.-wide ribbon to obtain a video tape (Specimen #17).

The video tapes (Specimens #12–17) were tested for the peeling strength (adhesiveness) of their coats and for the video sensitivity (RF at 4 MHz) on a VHS type video deck. Table 2 summarizes the results.

TABLE 2

| Specimen | Example | | | | | |
| --- | --- | --- | --- | --- | --- | --- |
|  | #12 | #13 | #14 | #15 | #16 | #17 |
| Peeling strength (g/½-in.) | 90 | 100 | 110 | 100 | 110 | 60 |
| RF sensitivity 4 MHz (dB) | 0.0 | 0.0 | 0.1 | 0.0 | 0.0 | 0.0 |

EXAMPLE 18

In the same manner as described in Example 14, a primer coat was applied on a polyester film. Then, a radiation-curable, magnetic coating material prepared by the method to be described later was applied thereon, and the resulting coat was oriented, dried and surface-smoothened, and was irradiated with electron beams in an $N_2$ atmosphere, using an ESI's "Electrocurtain" elctron-beam accelerator at an acceleration voltage of 160 kV with an electrode current of 10 mA to a radiation dosage of 5 Mrads. Slitting the coated film into a ½-in.-wide ribbon yielded a video tape (Specimen 18).

Method of preparing radiation-curable magnetic coating material

A mixture composed of
magnetic powder (cobalt-coated iron oxide)—120 parts
Resin (a)—15 parts (in terms of solids)
Resin (f)—15 parts (in terms of solids)
lubricant—0.2 part
α-$Al_2O_3$(0.5 μm in particle size)—2 parts
solvent (methyl ethyl ketone/toluene=1/1)—200 parts was dispersed on a ball mill for 24 hours, and a radiation-curable, magnetic coating material was prepared.

COMPARATIVE EXAMPLE 12

Instead of providing an undercoat on a polyester film, the radiation-curable, magnetic coating material of Example 18 was directly applied on the base, and the coat was treated and cured in the same way as in Example 18. The coated film was slitted into a ½-in.-wide ribbon to obtain a video tape (Specimen L).

Specimens #18 and L were tested for their adhesiveness and video sensitivity. Table 3 shows the results.

TABLE 3

| Specimen | Example #18 | Comparative Example 1 |
| --- | --- | --- |
| Peeling strength (g/½-in.) | 100 | 45 |
| RF sensitivity 4 MHz (dB) | 0.0 | 0.0 |

What is claimed is:

1. A magnetic recording medium comprising a polyester base, a magnetic coating layer, and a non-magnetic undercoat between said base and said magnetic coating layer, said undercoat comprising a radiation curable coating material which contains at least two types of compounds selected from the group consisting of:
   (A) compounds having a molecular weight of at least 5000 and at least two double bonds of a type selected from the group consisting of acrylic, allylic, and maleic double bonds;
   (B) compounds having a molecular weight of at least 400 but less than 5000 and at least one double bond of a type selected from the group consisting of acrylic, allylic and maleic double bonds; and
   (C) compounds having a molecular weight of less than 400 and at least one double bond selected from the group consisting of acrylic, allylic, maleic and styrenic double bonds.

2. A magnetic recording medium according to claim 1, wherein said compound (A) has a molecular weight of at least 8000 and said compound (B) has a molecular weight within the range of 600 to 3000.

3. A magnetic recording medium according to claim 1, wherein said radiation-curable coating material contains at least two types of said compounds (A), (B), and (C) in a mixing ratio of 0–95 wt. % (A), 0–80 wt. % (B), and 0–50 wt. % (C) based on total amounts of the compounds.

4. A magnetic recording medium according to claim 3, wherein said radiation-curable coating material contains said compounds (A) and (B) in a mixing ratio of 20–95 and 5–80 wt. %, respectively.

5. A magnetic recording medium according to claim 4 wherein said radiation is electron beams.

6. A magnetic recording medium according to claim 4 wherein said radiation-curable coating material additionally contains 0.1–10 wt. % of a photopolymerizable sensitizer on the basis of the total weight of the solid resin contents so that an undercoat can be formed by irradiation with ultraviolet rays.

7. A magnetic recording medium according to claim 4 wherein said radiation-curable coating material further contains at least one organic solvent.

8. A magnetic recording medium according to claim 3 wherein said radiation-curable coating material further contains at least one organic solvent.

9. A magnetic recording medium according to claim 3 wherein said radiation is electron beams.

10. A magnetic recording medium according to claim 3 wherein said radiation-curable coating material additionally contains 0.1–10 wt. % of a photopolymerizable sensitizer on the basis of the total weight of the solid resin contents so that an undercoat can be formed by irradiation with ultraviolet rays.

11. A magnetic recording medium according to claim 1 wherein said radiation is electron beams.

12. A magnetic recording medium according to claim 1 wherein said radiation-curable coating material additionally contains 0.1–10 wt. % of a photopolymerizable sensitizer on the basis of the total weight of the solid resin contents so that an undercoat can be formed by irradiation with ultraviolet rays.

13. A magnetic recording medium according to claim 12 wherein said radiation-curable coating material further contains at least one organic solvent.

14. A magnetic recording medium according to claim 1 wherein said radiation-curable coating material further contains at least one organic solvent.

* * * * *